(No Model.)
J. ROSE.
TUBE CUTTER AND EXPANDER.
No. 286,227. Patented Oct. 9, 1883.
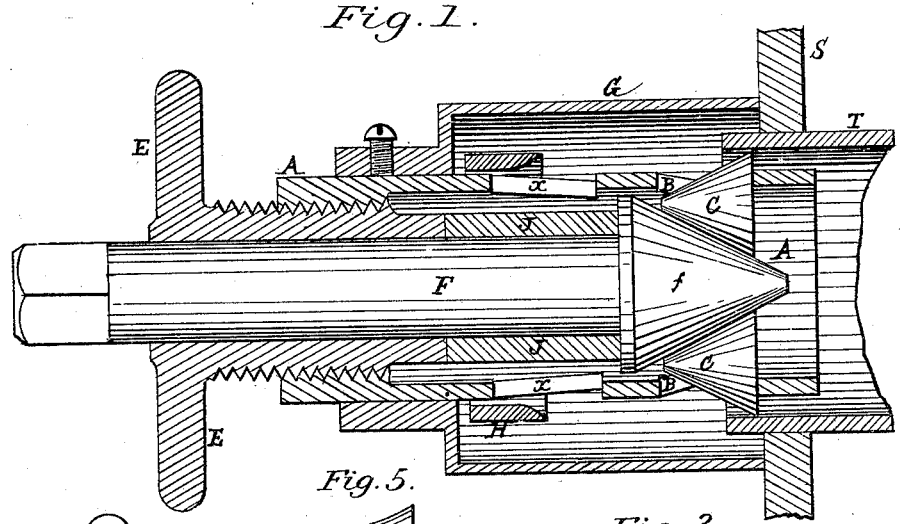
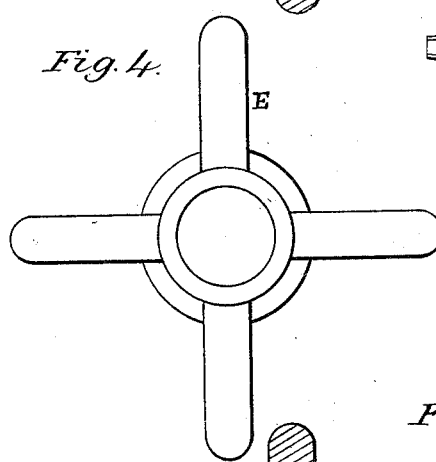
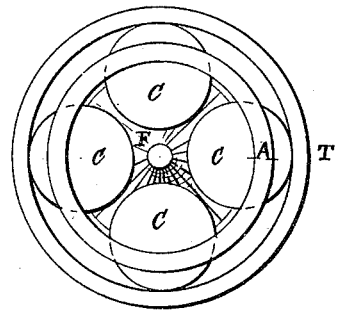
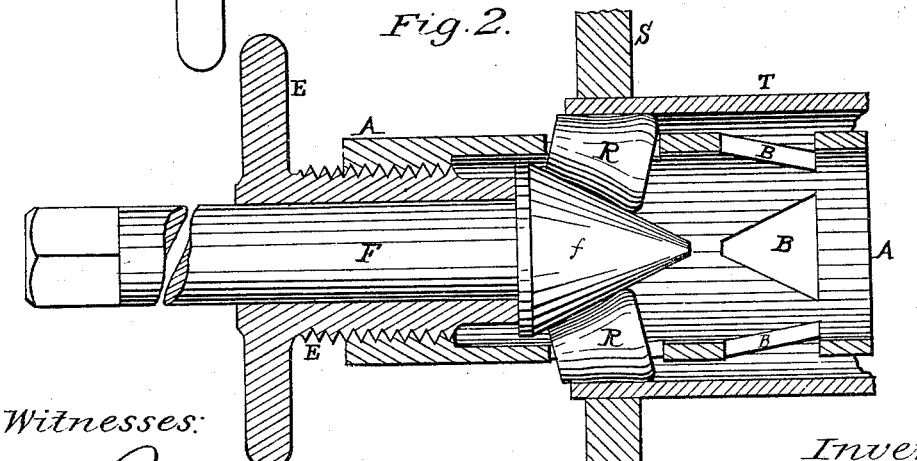
Witnesses:
Inventor:
Joshua Rose.

UNITED STATES PATENT OFFICE.

JOSHUA ROSE, OF NEW YORK, N. Y.

TUBE CUTTER AND EXPANDER.

SPECIFICATION forming part of Letters Patent No. 286,227, dated October 9, 1883.

Application filed March 6, 1883. (No model.)

*To all whom it may concern:*

Be it known that I, JOSHUA ROSE, of the city, county, and State of New York, have invented a new and useful Improvement in Tube Cutters and Expanders, of which the following is a specification.

My invention relates to that class of tube cutters and expanders in which rollers are employed to operate within the bore of the tube to be cut or expanded; and the object of my invention is to obviate the wear that is due to the use of feed-screws upon roll-driving screws, such screws necessarily being of small diameter, and therefore subject to rapid wear, because the thread requires to be operated while under the full pressure due to the cut. A further object of my invention is to simplify the mechanism as well as to make it more substantial. I attain these objects by the mechanism shown in the accompanying drawings, in which—

Figure 1 is a sectional side elevation of the tool in use as a tube-cutter. Fig. 2 is a sectional side elevation of the tool in use as an expander. Fig. 3 is an end view of the tool. Fig. 4 is an end view of the feed-nut, and Fig. 5 is a modification of the form of the cutting-rolls.

Similar letters refer to like parts throughout the several views.

In the drawings, T is a section of a boiler-tube in place in a tube-sheet, S.

A is a sleeve pierced with holes B, to receive the cutters C, threaded to receive the feed-nut E, and containing slots or holes $x$, to receive the expanding-rolls R.

F is a spindle squared at one end to receive a wrench, by means of which it may be revolved, and coned at $f$ to a degree corresponding to the cone of the cutting-rolls C, which it drives by friction.

G is a gage to regulate the length to which the tube shall be cut off, and H a ring to hold the cutting or the expanding rolls within the sleeve A; and J is a sleeve used in connection with the cutting-rolls, but removed when the expanding-rolls are in use.

The operation is as follows: The tool being inserted within the tube to be cut to length, the feed-nut E is screwed up, forcing the inner sleeve, J, forward, and therefore the spindle F, whose coned end $f$ forces cutters C against the bore of the tube T with sufficient pressure to cause them to cut it when the spindle F is revolved by a wrench applied to its squared end. The feed-nut E is screwed forward from time to time to put on a further feed until the cutting operation is completed. The cutting-rolls C and the interior sleeve, J, are then removed, and the expanding-rolls R are inserted, as in Fig. 2, the operation of these rolls and the method of feeding them being the same as for the cutting-rolls—that is to say, they rotate by friction when F is rotated, and are fed by screwing in the feed-nut E from time to time, as occasion may require.

H is a ring fitting loosely over sleeve A, and to be used to hold the rolls C and also rolls R in place within the sleeve A.

The modification in Fig. 5 consists in giving to the cutting-rolls a curved instead of a straight taper, thus making their cutting-edges sharper. The coned end $f$ of F may, obviously, be given a corresponding curve, as may also the expanding-rolls R, of which two or more may be employed, as may be deemed the best. It will be seen that spindle F has journal-bearing throughout the whole length of the bore of the feed-nut E, and, being plain, instead of having the usual screw-thread, its circumference is not subject to wear, because the thrust is taken against its shoulder, where the inner sleeve, J, or the end face of E meets it. Furthermore, it does not revolve continuously within the sleeve A, save when the feed-nut E is operated to put on the feed, because the end pressure on inner sleeve, J, causes an end pressure on feed-nut E, and this gives sufficient friction between the threads upon E and those within A to cause E, A, and F to revolve together until such time as F is pulled forward to put the feed on.

Having thus described my invention, what I claim as new, and desire to secure by Letters Patent, is—

The combination of the sleeve A, having the holes $x$ and B, and the interchangeable expanding and cutting rolls, with feed-nut E, spindle F, and removable sleeve J, whereby, by the use or not of the sleeve J, the tool is a tube cutter or an expander, substantially as set forth.

JOSHUA ROSE.

Witnesses:
ANDW. J. PROVOST,
WM. P. ILLENSWORTH.